(12) United States Patent
Thomas et al.

(10) Patent No.: US 10,722,902 B2
(45) Date of Patent: Jul. 28, 2020

(54) APPARATUS, COMPOSITION AND METHOD FOR RECYCLING A MATERIAL

(71) Applicant: CYCRETE PTY. LTD., Wanniassa (AU)

(72) Inventors: Donald Thomas, Canberra (AU); Michael Hogan, Canberra (AU); Jeffrey Shi, Sydney (AU)

(73) Assignee: Cycrete Pty, Ltd. (AU)

( * ) Notice: Subject to any disclaimer, the term of this patent is extended or adjusted under 35 U.S.C. 154(b) by 0 days.

(21) Appl. No.: 16/074,824

(22) PCT Filed: Feb. 2, 2017

(86) PCT No.: PCT/AU2017/050086
§ 371 (c)(1),
(2) Date: Aug. 2, 2018

(87) PCT Pub. No.: WO2017/132730
PCT Pub. Date: Aug. 10, 2017

(65) Prior Publication Data
US 2019/0060911 A1 Feb. 28, 2019

(30) Foreign Application Priority Data
Feb. 2, 2016 (AU) .................................. 2016900324

(51) Int. Cl.
*B03B 9/06* (2006.01)
*B03B 1/00* (2006.01)
(Continued)

(52) U.S. Cl.
CPC ................ *B03B 1/00* (2013.01); *B03B 9/063* (2013.01); *C04B 18/021* (2013.01);
(Continued)

(58) Field of Classification Search
CPC .. B03B 1/00; B03B 1/04; B03B 9/061; B03B 9/063; B03B 9/065; C04B 18/167;
(Continued)

(56) References Cited

U.S. PATENT DOCUMENTS 4,616,786 A * 10/1986 Riker ........................ B03B 5/56
209/910
5,244,498 A 9/1993 Steinke
(Continued)

FOREIGN PATENT DOCUMENTS

CN 105174852 A 12/2015
WO WO-2018224523 A1 * 12/2018 ............. B03B 9/063

OTHER PUBLICATIONS

European Patent Office, Espacenet English abstract for CN105174852, printed on Aug. 7, 2018.
(Continued)

*Primary Examiner* — Joseph C Rodriguez
(74) *Attorney, Agent, or Firm* — Cahn & Samuels, LLP (57) ABSTRACT

An apparatus, composition and method for recycling of a material, such as, for example, unhardened concrete. The apparatus includes a storage tank for storing a recycling composition to be applied to the material to be recycled and a control unit configured to control release of the recycling composition from the storage tank.

10 Claims, 9 Drawing Sheets

(51) Int. Cl.
 C04B 18/16 (2006.01)
 C04B 18/02 (2006.01)
 C04B 40/00 (2006.01)
 C04B 28/02 (2006.01)
(52) U.S. Cl.
 CPC ............ *C04B 18/167* (2013.01); *C04B 28/02* (2013.01); *C04B 40/0032* (2013.01); *C04B 40/0039* (2013.01); *C04B 40/0042* (2013.01); *Y02W 30/58* (2015.05); *Y02W 30/95* (2015.05)
(58) Field of Classification Search
 CPC . C04B 28/02; C04B 40/0032; C04B 40/0042; C04B 22/085; C04B 22/147; C04B 22/16; C04B 24/2641
 See application file for complete search history.

(56) References Cited

U.S. PATENT DOCUMENTS

| | | | | |
|---|---|---|---|---|
| 5,427,617 | A | 6/1995 | Bobrowski et al. | |
| 5,992,774 | A * | 11/1999 | Oh | B03B 9/065 209/12.1 |
| 6,259,222 | B1 * | 7/2001 | Kira | B02C 25/00 241/35 |
| 6,682,655 | B2 | 1/2004 | Beckham et al. | |
| 7,824,096 | B2 * | 11/2010 | Lindblom | B28C 5/4231 137/565.12 |
| 8,746,954 | B2 * | 6/2014 | Cooley | B28C 5/422 366/143 |
| 9,216,925 | B2 * | 12/2015 | Ferrari | C04B 18/021 |
| 9,790,131 | B2 * | 10/2017 | Lee | C04B 22/10 |
| 2010/0159247 | A1 * | 6/2010 | Kaya | B02C 23/12 428/402 |
| 2017/0267592 | A1 * | 9/2017 | Bell, Jr. | C04B 18/021 |
| 2017/0320775 | A1 * | 11/2017 | Kurz | C04B 18/021 |

OTHER PUBLICATIONS

Australian Patent Office, International Search Report for PCT App. No. PCT/AU2017/050086, dated May 3, 2017.
Australian Patent Office, Written Opinion for PCT App. No. PCT/AU2017/050086, dated May 3, 2017.

\* cited by examiner

EXAMPLE 1

| Concrete Mix | | | Recycling composition | | | Resultant Material Condition | | |
|---|---|---|---|---|---|---|---|---|
| Sand | 18.3 | Kg | Sodium polyacrylate [-CH2-CH(CO2Na)-] | 200 | gms | Aggregate - Matted | No | 80% |
| Aggregate 10mm | 5.2 | Kg | Calcium Nitrate $CaNO_3$ | 50 | gms | Aggregate - Sticky | No | |
| Aggregate 20mm | 16.2 | Kg | Dicalcium Phosphate Dihydrate $CaHPO_4.nH_2O$ (n=2) | 5 | gms | Aggregate - Seperated | Yes | |
| Cement | 6.1 | Kg | Sodium Sulphate Anhydrous $Na_2SO_4$ | 5 | gms | Aggregate - Friable/Loose | Yes | |
| Water | 4.5 | Kg | Magnesium Phosphate $Mg_3(PO_4)_2$ | 5 | gms | Aggregate - Coating | Fine | |
| Total | 50.3 | Kg | Total | 265 | gms | Cementitious fines | Soft | 20% |

Agitator Cleanliness (out of 10)  9
Compressive strength concrete fromed with resultant material  25 MPA

EXAMPLE 2

| Concrete Mix | | | Recycling composition | | | Resultant Material Condition | | |
|---|---|---|---|---|---|---|---|---|
| Sand | 18.3 | Kg | Sodium polyacrylate [-CH2-CH(CO2Na)-] | 100 | gms | Aggregate - Matted | No | 70% |
| Aggregate 10mm | 5.2 | Kg | Calcium Nitrate $CaNO_3$ | 50 | gms | Aggregate - Sticky | No | |
| Aggregate 20mm | 16.2 | Kg | Dicalcium Phosphate Dihydrate $CaHPO_4.nH_2O$ (n=2) | 5 | gms | Aggregate - Seperated | Yes | |
| Cement | 6.1 | Kg | Sodium Sulphate Anhydrous $Na_2SO_4$ | 5 | gms | Aggregate - Friable/Loose | Yes | |
| Water | 3 | Kg | Magnesium Phosphate $Mg_3(PO_4)_2$ | 5 | gms | Aggregate - Coating | Fine | |
| Total | 48.8 | Kg | Total | 165 | gms | Cementitious fines | Moderate | 30% |

Agitator Cleanliness (out of 10)  8

Figure 10

APPARATUS, COMPOSITION AND METHOD FOR RECYCLING A MATERIAL

FIELD OF THE INVENTION

The present invention relates to an apparatus, composition and method for recycling a material, and in particular, but not limited to, an apparatus, composition, and method for recycling wet/unhardened/fresh concrete leftover in the agitator bowls of mixer trucks and other storage vessels to provide aggregate material.

BACKGROUND OF THE INVENTION

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

It is often desirable to recycle left over construction materials. With concrete for example, construction teams will generally prepare more fresh concrete than required to avoid being left without enough to complete a task. The residual unhardened concrete often remains in the agitator bowls of mixer trucks and other storage vessels. This residual concrete can be onerous and expensive to remove, recycle and dispose of.

Compositions/formulations have been developed which assist with wet/unhardened residual concrete processing and recycling. However, these formulations are often made up of component parts that need to be packaged separately. Typically, these component parts are stored in water soluble bags that are thrown into the concrete storage vessels. These methods have several disadvantages.

Firstly, the component parts are often packaged in a limited number of volume sizes. This places the onus on workmen to calculate the required number of bags of each component part to match the amount of residual concrete to be processed. This takes time, and often results in an excess amount of formulation being used. Alternatively, if the number of bags to be used is miscalculated, an ineffective amount of formulation may be applied leading to ineffective breakdown of the concrete.

Secondly, the water soluble bag type distribution method often results in inadequate/non uniform distribution of the component parts in the agitator bowl/storage vessel. Therefore, the method requires considerable mixing, and even so, pockets of unmixed formulation may be found.

In addition, existing concrete recycling methods often require further processing. Although the addition of compositions/formulation may assist with processing/recycling of the residual unhardened concrete, it is often the case that the processed concrete needs to be subsequently physically broken down. For example, often after any formulation is applied, the processed concrete is required to be further broken down with an excavator or the like.

The present invention seeks to address at least some of the above mentioned disadvantages by providing an apparatus, composition and method for recycling materials like, for example, unhardened concrete.

SUMMARY OF THE INVENTION

In one broad form, the present invention provides an apparatus for assisting with recycling of a material, the apparatus including: a storage tank for storing a recycling composition to be applied to the material to be recycled; and a control unit configured to control release of the recycling composition from the storage tank.

In one form, the control unit is configured to control release of the recycling composition based on data received related to the material to be recycled. In one form, data related to the material to be recycled includes data related to the quantity, quality and/or composition of the material to be recycled.

In one form, the apparatus further includes at least one sensor, the at least one sensor for detecting at least one parameter related to the quantity of recycling composition in the storage tank.

In one form, the control unit is configured to control release of the recycling composition by comparing data received from the at least one sensor related to the quantity of recycling composition in the storage tank with a dispensation quantity calculated based on data received related to the material to be recycled.

In one form, the apparatus further includes an ejection system for propelling recycling composition released from the storage tank along a delivery line to an outlet nozzle. In one form, the ejection system is a pneumatic ejection system. In one form, the ejection system is controlled by the control unit.

In one form, the outlet nozzle is located at the distal end of an elongate substantially rigid delivery wand. In one form, the delivery wand extends from a flexible hose.

In one form, the apparatus includes a trolley frame that permits the apparatus to be rolled along a surface.

In one form, the recycling composition is a powder.

In one form, the material to be recycled is unhardened concrete.

In one form, the apparatus includes an elevated platform, the elevated platform configured to support a person at a height where they can access an opening of an agitator bowl of a concrete mixer truck.

In one form, the apparatus includes an alarm, the alarm connected to the control unit and configured to be activated subsequent to ejection of recycling composition and after a calculated mixing time, the calculated mixing time being related to the quantity of unhardened concrete to be recycled. In one form, the alarm is an audible alarm.

In one form, the apparatus further includes a separation system configured to receive and separate, according to size, material treated with the recycling composition. In one form, the separation system includes one or more vibrating sieves.

In one form, the apparatus further includes a communication module for transmitting data from the control unit to a remote processing system via a communication network.

In a further broad form the present invention provides, a composition for processing unhardened concrete to form an aggregate material, the composition including: a Super Absorbent Polymer; and one or more hygroscopic compounds.

In one form, the super absorbent polymer is a polyacrylate. In one form, the super absorbent polymer is selected from the group consisting of sodium polyacrylate, lithium polyacrylate, potassium polyacrylate or ammonium polyacrylate.

In one form, the one or more hygroscopic compounds are selected from the group consisting of $CaNO_3$, $CaHPO_4.2H_2O$, $Na_2SO_4$, and $Mg_3(PO_4)_2$.

In a further broad form, the present invention provides a composition for processing unhardened concrete to form an aggregate material, the composition including 55 to 80 wt.

% Super Absorbent Polymer. In one form, the Super Absorbent Polymer is a polyacrylate. In one form, the Super Absorbent Polymer is selected from the group consisting of sodium polyacrylate, lithium polyacrylate, potassium polyacrylate or ammonium polyacrylate.

In one form, the composition includes a hygroscopic compound. In one form, the composition includes 15 to 35 wt. % $CaNO_3$. In one form, the composition includes 1 to 4 wt. % $CaHPO_4.2H_2O$. In one form, the composition includes 1 to 4 wt. % $Na_2SO_4$. In one form the composition includes 1 to 4 wt. % $Mg_3(PO_4)_2$.

In a further broad form, the present invention provides a composition for processing unhardened concrete to form an aggregate material, the composition including: 55 to 80 wt. % sodium polyacrylate; 15 to 35 wt. % $CaNO_3$; 1 to 4 wt. % $CaHPO_4.2H_2O$; 1 to 4 wt. % $Na_2SO_4$; and 1 to 4 wt. % $Mg_3(PO_4)_2$.

In one form, the present invention provides use of a composition as described in any one of the above forms in the recycling of unhardened concrete.

In a further broad form, the present invention provides a method of recycling unhardened concrete to form aggregate material, the method including the steps of: treating the unhardened concrete with a recycling composition; and mixing the treated unhardened concrete.

In one form, the recycling composition is a composition as described in any one of the above forms. In one form, the unhardened concrete is treated with 3 to 6 kg of recycling composition per tonne of unhardened concrete.

In one form, the method further includes the step of calculating the quantity of recycling composition required for effective treatment of the unhardened concrete using information based on the quantity, quality, and/or composition of the unhardened concrete to be treated. In one form the step of calculating the quantity of recycling composition required is facilitated by the apparatus as described in any one of the above forms.

In one form, the method further includes the step of calculating a mixing time required for recycling of the concrete based on the quantity, quality, and/or composition of the unhardened concrete to be treated. In one form the step of calculating the mixing time is facilitated by the apparatus as described in any one of the above forms.

In one form the method further includes including the step of separating formed aggregated material, according to size. In one form, the step of separating the formed aggregate material is facilitated by an apparatus as described in any one of the above forms that includes a separation system.

In a further broad from, the present invention provides a system for dispensing a material from a storage tank, the system including: a control unit configured to be retrofitted to a storage tank to control release of material from the storage tank; and an ejection system configured to be retrofitted to the storage tank, the ejection system also configured to propel material released from the storage tank along a delivery line to an outlet nozzle. In one form, the outlet nozzle is located at the distal end of an elongate substantially rigid delivery wand.

BRIEF DESCRIPTION OF THE DRAWINGS

This invention may be better understood with reference to the drawings in which.

DETAILED DESCRIPTION

Embodiments of the present invention an apparatus for assisting with recycling of a material. The apparatus includes a storage tank for storing a recycling composition, the recycling composition to be applied to the material to be recycled. A control unit is configured to control release of the recycling composition from the storage tank. The control unit may take a variety of forms but typically includes an electronic processing device/system such as, for example, a computer system, microcontroller, program logic controller or the like.

Typically the control unit is configured to control release of the recycling composition based on data received related to the material to be recycled. As release of recycling composition from the storage stank is dependent on data related to material to be recycled, the apparatus allows for accurate dispensation of recycling composition without wastage or dispensation of ineffective quantities.

Data related to the material to be recycled may include data related to the quantity, quality and/or composition of the material to be recycled. Typically, on the basis of the data received, the control unit calculates a required dispensation quantity of the recycling composition.

Generally, the apparatus also includes at least one sensor for detecting at least one parameter related to the quantity of recycling composition in the storage tank. By analysing data received from the at least one sensor, the control unit can monitor the amount of composition released from the storage tank. Furthermore, by comparing information/data received from the at least one sensor (i.e. related to the quantity of recycling composition in the storage tank) with the required dispensation quantity, the control unit can effectively control release of recycling composition from the storage tank such that only the dispensation quantity is released. Typically, composition is released from the storage tank via control of at least one valve at the storage tank.

As described above the required dispensation quantity is typically calculated based on data received by related to the material to be recycled (e.g. quantity, composition, quality). Such data may, for example, be input into the control unit by an operator after an assessment of the material to be recycled.

The apparatus also typically includes an ejection system for propelling recycling composition released from the storage tank along a delivery line to an outlet nozzle. For example, the ejection system may a pneumatic ejection system. The ejection system would also typically be controlled by the control unit. A pneumatic ejection system is particularly suitable for when the recycling composition is in powder form. However, it will be appreciated that other types of ejection systems may be implemented and the apparatus may also be configured for storage and dispensation of recycling compositions in non-powder form (e.g. liquid from).

The outlet nozzle is typically located at the distal end of an elongate substantially rigid delivery wand. The delivery wand extending from a flexible hose of the delivery line. A rigid delivery wand allows for application of recycling composition deep into storage vessels (where material to be recycled may be stored) that have a relatively small opening. The delivery wand thus contributes to encouraging even dispensation of recycling composition over the material to be recycled such that less mixing is ultimately required.

The apparatus may also include a trolley frame that permits the apparatus to be rolled along a surface. The apparatus can thus easily be maneuvered, such as, for example between vessels where material to recycled may be stored.

The apparatus has particular application in the recycling of unhardened/fresh/wet concrete. However, it will be appreciated that the apparatus may be implemented for other types of materials where a recycling composition needs to be applied in accurate amounts.

Generally, the apparatus is configured to be used for assisting with the treatment of leftover unhardened concrete remaining in the agitator bowls if mixer trucks. Thus the apparatus may include an elevated platform, the elevated platform configured to support a person near to an opening of an agitator bowl. The elevated platform thus allows an operator to easily investigate the contents of the agitator bowl as well as easily dispense the recycling composition therein, e.g. with insertion of the delivery wand.

The apparatus may also include an alarm, the alarm connected to the control unit and configured to be activated subsequent to ejection of recycling composition and after a calculated mixing time. The calculated mixing time may be calculated by the control unit based on data related to the unhardened concrete to be recycled, such as, for example, the quantity of same. Typically, the alarm is an audible alarm and, on hearing the alarm, an operator would know sufficient mixing has taken place and that is it time to stop rotation of the agitator bowl.

Application of the recycling composition may, in some instances, result in processed material of different sizes. In the processing of unhardened concrete for example, often the resultant material is to be used as aggregate for the production of new concrete and forms in different sizes. As such, the apparatus may also include a separation system configured to receive and separate, according to size, material treated with the recycling composition. In one example, the separation system includes one or more vibrating sieves. It will be appreciated that, in some examples, mixing may be required after application of the recycling composition to form the aggregate material to be received by the separation system.

The apparatus may also include a communication module for transmitting data from the control unit to a remote processing system via a communication network (e.g. wireless network (e.g. Wi-Fi), Wide Area Network (WAN), Local Area Network (LAN), cellular data network (e.g. 4g), the internet etc.). This can provide advantages in that data related to activity of the apparatus (such as, for example, the amount of composition released by a particular operator or at a particular site) may be transmitted to a cloud based server for example, where it may be retrieved for subsequent analysis.

Embodiments of the present invention also provide a novel recycling composition for use with the apparatus. Typically, the recycling composition acts to absorb water from the wet/unhardened concrete, accelerating the drying process. Generally, application of the recycling composition, in combination with mixing, results in an aggregate material that may be used in the production of new concrete. The nature of the recycling composition is also such that the aggregate material formed is loosely packed (i.e. forms separated granular material) such that it may easily be separated according to size using a separation system as described above. It will be appreciated that the resultant material also typically includes leftover cementitious particles which may also be separated out using a separation system. Generally, the recycling composition is applied to the wet/unhardened concrete in powder form.

Typically, the composition includes a Super Absorbent Polymer (SAP). In some examples, the Super Absorbent Polymer is a polyacrylate. In some examples, the Super Absorbent Polymer (SAP) is a polyacrylate salt such as, for example, sodium polyacrylate, lithium polyacrylate, potassium polyacrylate or ammonium polyacrylate. In one example, the composition includes 55-80 wt. % super absorbent polymer. Other acceptable ranges include 60-80 wt. %, 65-80 wt. %, 70-80 wt. %, 75-80 wt. %, 55-60 wt %, 55-65 wt %, 55-70 wt %, or 55-75 wt % super absorbent polymer.

The composition may also include one or more hygroscopic compounds. For example the composition may include any one or a combination of $CaNO_3$, $CaHPO_4.2H_2O$, $Na_2SO_4$, and $Mg_3(PO_4)_2$. In some examples, the composition includes 15-35 wt. %. $CaNO_3$. Other acceptable ranges include 15-30 wt. %, 15-25 wt. %, 15-20 wt. %, 30-35 wt. %, 25-35 wt. %, or 20-35 wt. % $CaNO_3$.

In some examples the composition includes 1-4 wt. % $CaHPO_4.2H_2O$. Other acceptable ranges include 1-3 wt. %, 1-2 wt. %, 2-3 wt. %, 2-4 wt. % or 3-4 wt. % $CaHPO_4.2H_2O$. In some examples the composition includes 1-4 wt. % $Na_2SO_4$. Other acceptable ranges include 1-3 wt. %, 1-2 wt. %, 2-3 wt. %, 2-4 wt. % or 3-4 wt. % $Na_2SO_4$. In some examples the composition includes 1-4 wt. % $Mg_3(PO_4)_2$. Other acceptable ranges include 1-3 wt. %, 1-2 wt. %, 2-3 wt. %, 2-4 wt. % or 3-4 wt. % $Mg_3(PO_4)_2$.

In one particular form, the composition includes: 55 to 80 wt. % sodium polyacrylate, 15 to 35 wt. % $CaNO_3$, 1 to 4 wt. % $CaHPO_4.2H_2O$, 1 to 4 wt. % $Na_2SO_4$, and 1 to 4 wt. % $Mg_3(PO_4)_2$.

One particular form of the apparatus is shown in FIGS. 1 to 5. The apparatus (100) is for assisting with the recycling of unhardened concrete, and, in particular, unhardened concrete that is left over in the agitator bowls of concrete mixer trucks after use. It will however be appreciated that the apparatus (100) may be used to assist with the recycling of unhardened concrete remaining in other concrete storage vessels.

The apparatus includes a storage tank (1) for storing a recycling composition to be applied to the unhardened concrete. As described above the recycling composition may take a variety of forms, and typically acts to process the wet/fresh concrete into a hardened aggregate material that can be used in the production of new concrete. In some examples, the composition includes any one or a combination of $CaNO_3$, $CaHPO_4.2H_2O$, $Na_2SO_4$, sodium polyacrylate, and/or $Mg_3(PO_4)_2$. The recycling composition is typically in powder form, and can be re-filled into the storage tank (1) via the fill point opening (3). It will be appreciated that the recycling composition may, in some examples, be in non-powder form.

The apparatus includes a control unit (10) configured to control release of recycling composition from the storage tank (1). In this example, the control unit (10) is a suitably configured Program Logic Controller. However, it will be appreciated that the control unit (10) may take a variety of forms and may comprise any suitably configured electronic processing device/system. The control unit (1) controls release of recycling composition via control of a valve (V2) at the storage tank outlet (4). The outlet (4) is located at the base of the storage tank (1) and the storage tank (1) has an internal baffle (2) angled towards the outlet (4) such that recycling composition is directed/encouraged toward the outlet (4).

The control unit (10) is configured to control release of the recycling composition from the storage tank (1) based on data related to the unhardened concrete to be treated. For example, such data may relate to the quantity, quality and/or composition of the unhardened concrete. In particular, based on data related to the unhardened concrete, the control unit is configured to calculate an appropriate dispensation quantity of the recycling composition that would be effective in processing the amount of unhardened concrete remaining in the agitator bowl. For example, the appropriate dispensation quantity may be calculated from parameters like mass of unhardened concrete in the agitator bowl, water content, composition of the concrete, and/or slump test results etc.

The storage tank (1) includes load sensors (15) for detecting the mass of recycling composition present in the storage tank (1). The load sensors are in communication with the control unit (10), and, based on data received from the load sensors (15), the control unit (10) is able to determine the amount of recycling composition released from the storage tank (1). The control unit (10) then compares the amount of recycling composition released from the storage tank with the calculated dispensation quantity (e.g. calculated based on data related to the properties of the unhardened concrete input into the control unit by the operator) to stop release appropriately. This ensures that only an effective amount of recycling composition is released from the storage tank (1) i.e. not too little such that an incomplete amount of the unhardened concrete is processed, and not too much such that there is wastage of the recycling composition.

Typical operation of the apparatus (100) in one example may be as follows. A batch of unhardened concrete remaining in an agitator bowl (21) would first be assessed by an operator to determine values/parameters associated with the quantity, quality, or composition of the unhardened concrete. The operator would then input these values into the control unit via a control unit user interface. Based on input information, the control unit calculates the appropriate amount of recycling composition/formulation that should be released from the storage tank in order to effectively treat the batch i.e. the dispensation quantity. The control unit (10) then communicates with the load sensors (15) and controls the valve(s) at the outlet (4) of the storage tank such that only an appropriate amount of formulation/composition is released. No complex calculation of the dispensation quantity is required to be carried out by the operator, which makes the application of the recycling composition/formulation quick and accurate, and removes the opportunity for any miscalculation due to human error.

It will be appreciated that a concrete storage vessel (e.g. the agitator bowl of a mixer truck) may also be fitted with appropriate sensors etc. to determine values related to the unhardened concrete such as, for example, the mass, composition or water content thereof. The concrete storage vessels may also include communication/transmission means, such that parameters/values may be automatically transmitted to the control unit (10) of the apparatus (100) rather being manually input by an operator. In one example, concrete information may be transmitted to the control unit (10) of the apparatus (100) automatically once the agitator bowl of a mixer truck is within a particular proximity of the apparatus (100).

It will also be appreciated that the control unit (10) may include an appropriate communication module for communication with such 'smart' concrete storage vessels via any one or a combination of communication networks (e.g. via WiFi, 4g, the internet etc.). It will also be appreciated that in some forms, information may be similarly transmitted to the control unit (1) remotely by an operator using a mobile communication device (e.g. smart phone) or other remote interface.

Figure 8:
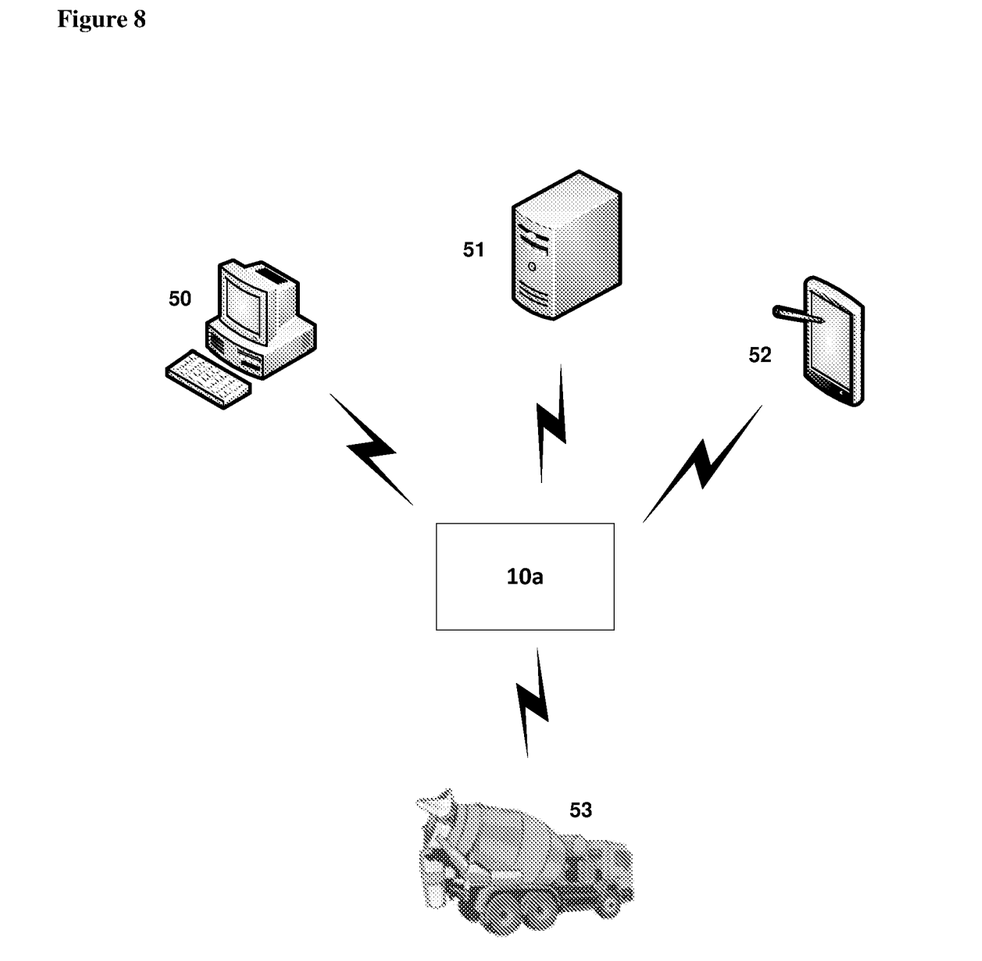
FIG. 8 shows example connectivity of a communications module of the apparatus.

The control unit (10), via the communication module, may also transmit data related to the activity of the apparatus to a remote processing system (50). For example, in a situation where the apparatus is leased, data related to the amount of composition used by a particular operator may be transmitted to a remote processing system (e.g. cloud based server) and recorded in a database. Based on recorded information, appropriate invoicing could be generated automatically for a particular operator based on the amount of composition used. Therefore, rather than pre-purchasing a bulk amount of recycling composition, this permits an operator to only pay for the recycling composition that they use.

The apparatus (100) also includes an ejection system for propelling recycling composition released from the storage tank (1) along a delivery line (14) to an outlet nozzle (12a). The ejection system in this instance is a pneumatic ejection system and includes an compressor air supply (5) that powers a vacuum conveyor device (16) fitted in the delivery line (14). The compressed air supply is typically provided by an air compressor (5) and is also controlled by the control unit (10). It will be appreciated that the vacuum conveyor device may take a variety of forms but generally operates to create suction in the delivery line such that there is flow of the recycling composition towards the outlet nozzle. For example, the vacuum conveyor device may include vacuum pump, venturi device or aspirator etc. One particular example of a suitable vacuum conveyor device is the Line Vac™ produced by EXAIR™ Air supply hoses (13) connect the air supply to valves (V1, V3, V4) at the storage tank (1), delivery line (14) and vacuum conveyor device (16).

The delivery line (14) is formed at least partly by a flexible hose (14) that extends into an elongate rigid delivery wand (12), with the outlet nozzle being located at the distal end of the delivery wand (12). As shown most clearly in FIG. 2, having a rigid delivery wand (12) allows the outlet nozzle (12a) to be inserted deep into the agitator bowl (21) of the concrete mixer such that recycling composition can be dispersed evenly over the unhardened concrete remaining in the bowl (21). A retractable hose reel (26) is included to effectively pack the flexible hose (14).

Figure 7:
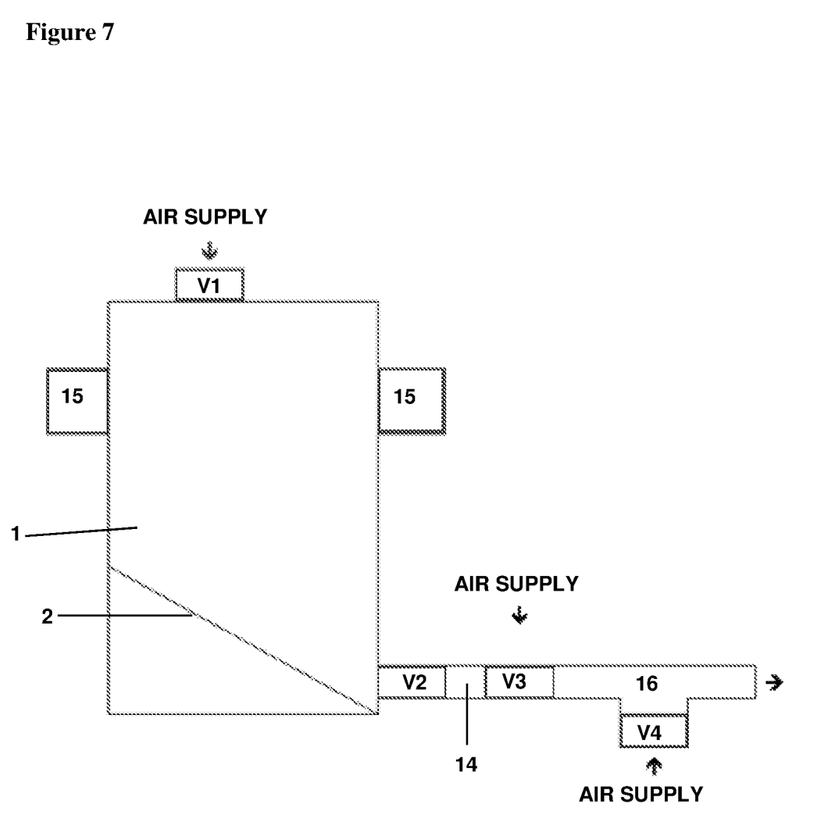
FIG. 7 shows an example storage tank and valve arrangement for use in the apparatus of FIG. 1.

The nature/configuration of the ejection system may vary although one example includes a compressed air supply (5) (e.g. by air compressor) in connection with a vacuum conveyor device (16) fitted to the delivery line (14) as shown in FIG. 7. Example ejection with the configuration of FIG. 7 may be as follows. At first instance, the mass of unhardened concrete required to be recycled is input into the control unit (10). As described previously, it will be appreciated that this information can be input into the control unit (1) via a user interface and/or received directly from a concrete storage vessel equipped with appropriate communication means to transmit such information.

Once the mass of the unhardened concrete is received by the control unit (10), the control unit (10) calculates the amount of recycling composition that is required to be dispensed (i.e. the dispensation quantity). To release recycling composition from the storage tank the control unit opens a valve (V1) situated in an upper part of the storage tank (1) that allows make up air from the air supply (5) to enter the tank (1). Subsequently, the air compressor (5) is operated and a valve (V4) opened to allow air from compressor (5) into the vacuum conveyor device (16) to create suction in the delivery line (14). Outlet valve (V2) is then opened at the storage tank (1) and the recycling composition is drawn into the delivery line (14).

As the recycling composition is released from the storage tank (1) the control unit (10) monitors the information from the load cells (15) such that when the amount released from the storage tank is equal to the required dispensation quantity for the particular mass of unhardened concrete to be recycled, the control unit shuts valves V1 and V2 to stop release of recycling composition. Purge valve (V3) is then opened to allow make up air from air supply (5) into the delivery line (14) to purge the delivery line (14). Once the delivery line (14) is purged, all the valves are closed and the compressor (5) shuts down.

Figure 1:
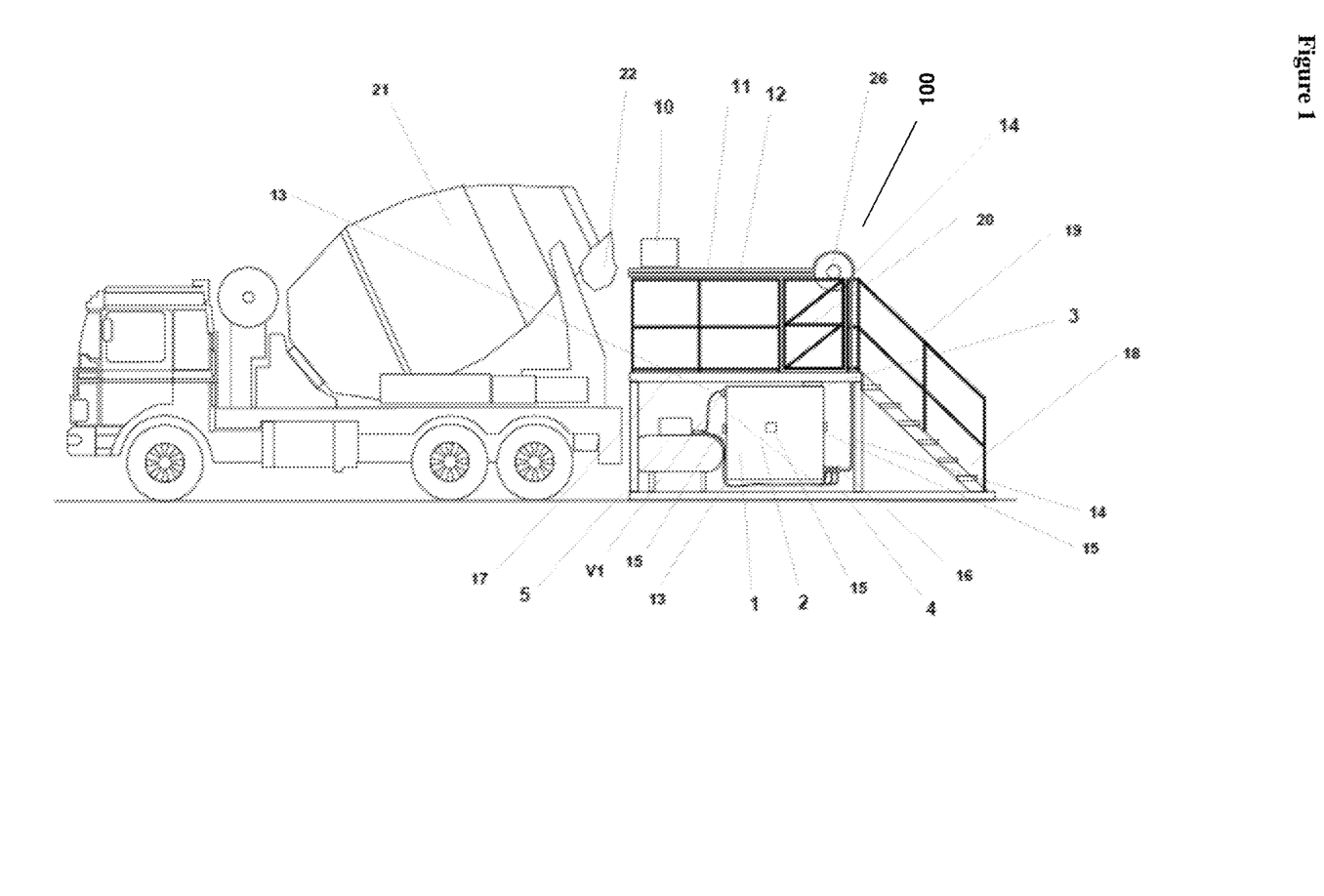
FIG. 1 is a side view of one example of an apparatus according to the invention positioned adjacent a mixer truck.
Figure 2:
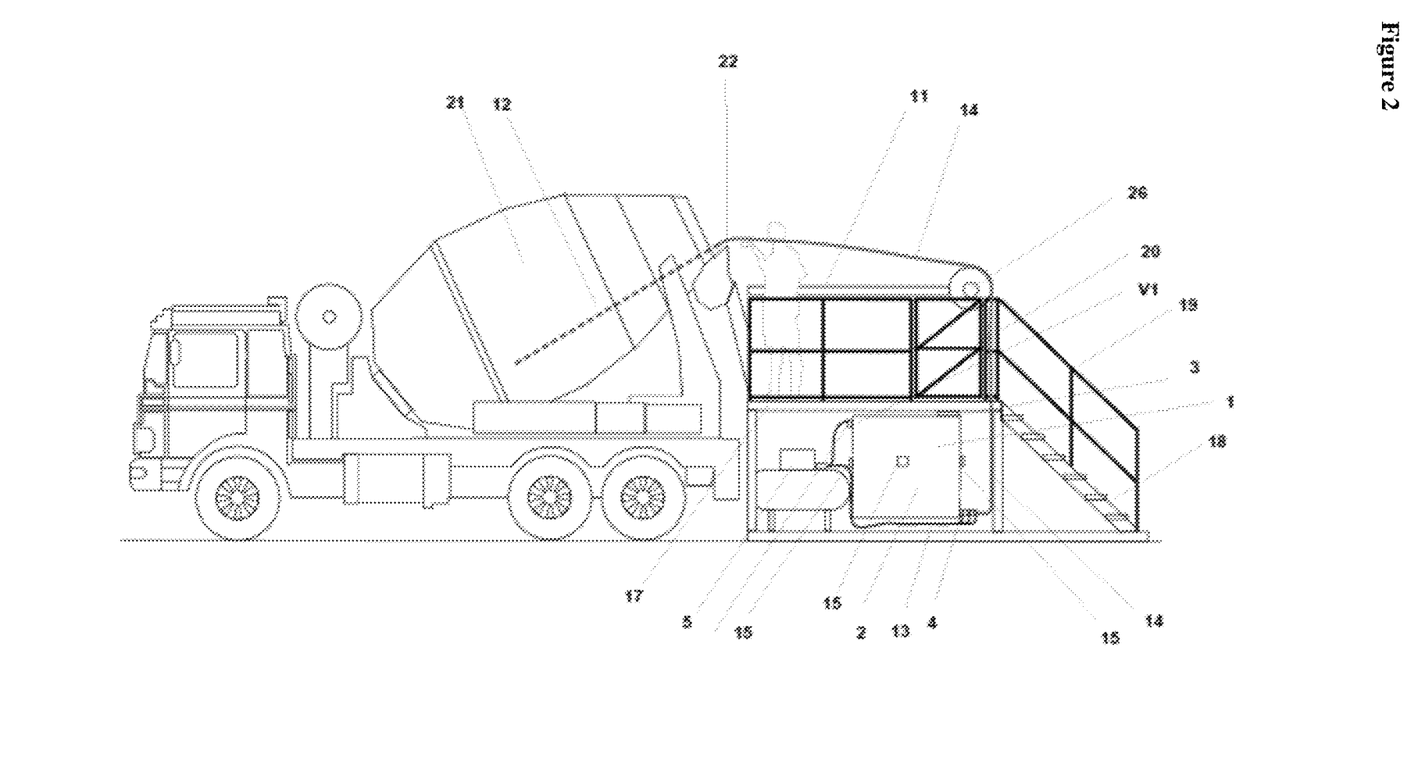
FIG. 2 is a side view of one example of the apparatus of FIG. 1, showing operator on the elevated platform thereof.
Figure 3:
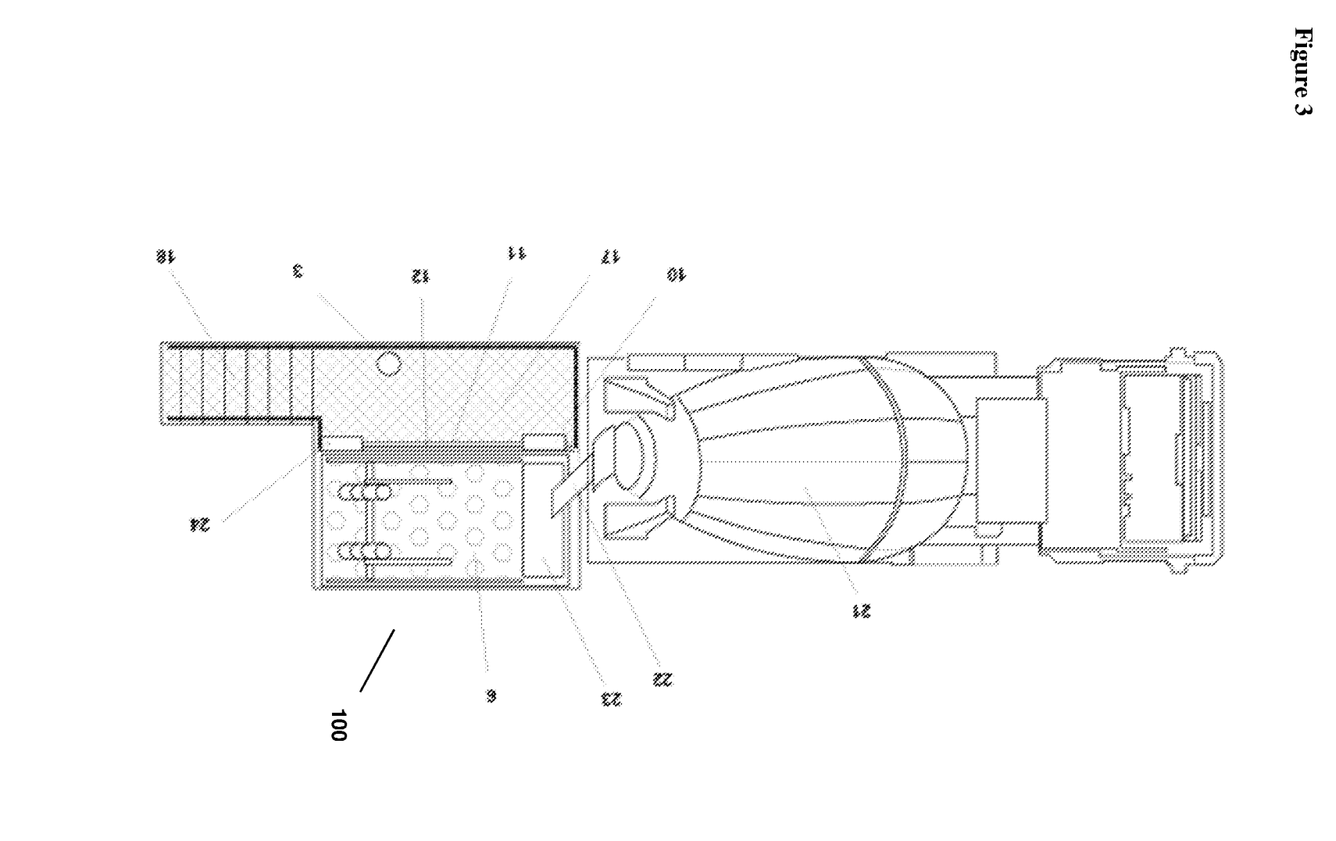
FIG. 3 is a top view of the apparatus of FIG. 1.
Figure 4:
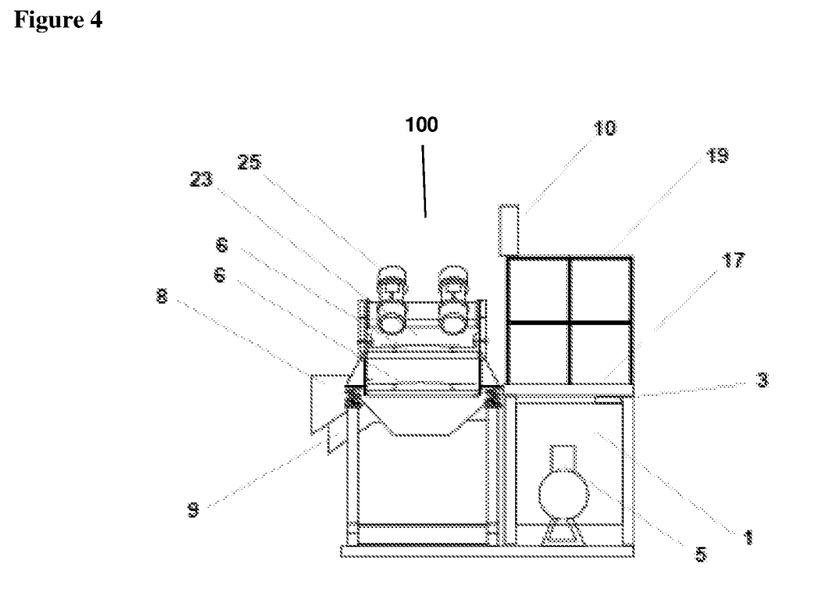
FIG. 4 is a front view of the apparatus of FIG. 1.
Figure 5:
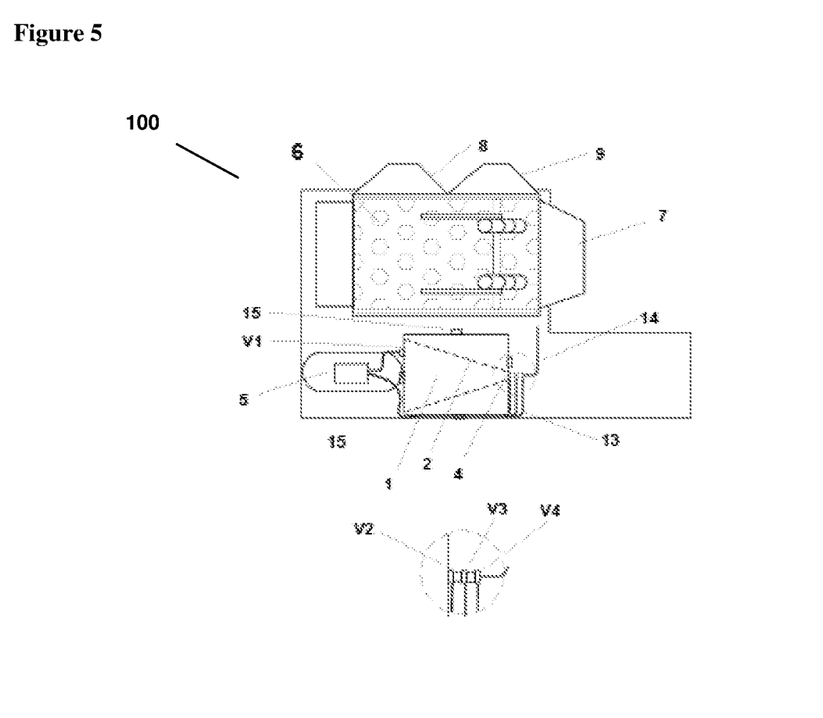
FIG. 5 is a top view of the apparatus of FIG. 1 with elevated platform removed.

The apparatus (100) also includes a frame that allows it be mobile and easily positioned adjacent to the agitator bowl (21) of a mixer truck. For example, the frame may be configured to be suitable for lifting by a forklift, or may include wheels or rollers to allow it be rolled along the surface. The frame also includes an elevated platform (17) configured to support an operator at a height where they can easily access the opening of the agitator bowl (21) of the mixer truck (e.g. see FIG. 2). The operator can access the elevated platform (17) via stairs (18), and a balustrade (19) provides support and safety. Beneath the elevated platform (17) the frame provides a lower platform for the storage tank (1) and the ejection system, with the delivery line (14) typically extending from the lower platform to the elevated platform (17). FIG. 5 shows a top view of the apparatus with the elevated platform (17) removed.

The delivery wand (12) is secured in a purpose built mount (11) accessible from the elevated platform (17). In some examples delivery wand mount (11) is connected to the control unit (1) and controlled thereby such that the wand can only be released at certain times (such as, for example, when the agitator bowl of the truck is not moving etc.). From the elevated platform (17) the operator may also refill the storage tank with recycling composition via storage tank fill point (3). Access to the fill point (3) is typically provided by an access gate (20) in the balustrade.

The elevated platform (17) also allows for visual inspection of the inside of the agitator bowl to assess the amount/volume of unhardened concrete to be recycled. As described above this information can then be input into the control unit (10) for calculation of the dispensation quantity. Furthermore, in industry, it is not uncommon for customers/builders to be invoiced for removal/recycling based on the amount of leftover unhardened concrete. With the presently described apparatus, an operator can estimate the amount of leftover concrete from the elevated platform, and input this information into the control unit (10). The information can then be transmitted to a remote processing system (50) (e.g. a cloud based server) for recordal and subsequent review. Based on this information, more accurate invoicing for recycling services can be issued. Currently, in prior art methods, it is becoming increasingly difficult to inspect the inside of agitator bowls as safety restrictions that prohibit ladders from being fixed to the side of concrete mixer agitator bowls are becoming more common.

Generally, after the recycling composition has been dispersed onto the unhardened concrete, the agitator bowl (21) is rotated for a period of time such that the unhardened concrete is effectively processed. The control unit (10) is configured to calculate the appropriate mixing time (e.g. based on information relating to the unhardened concrete and/or the amount recycling composition that has been dispensed). Once the calculated mixing time has elapsed the control unit then activates an alarm (30), to advise the operator to stop rotation of the agitator bowl. Typically the alarm (30) is an audible alarm. It will also be appreciated that the control unit (10), in some examples, may be configured to communicate directly with (or operate) the agitator bowl such that it may be started/stopped automatically in line with operation of the apparatus (100). For example, the control unit may be configured to stop the agitator bowl while recycling composition is being dispensed therein, and then, after dispensation, start rotation of the bowl for the required mixing time.

As previously described, generally after processing with the recycling composition, the unhardened concrete is formed into granules/aggregate of different sizes and cementitious material. To assist with separation of the aggregate according to size, the apparatus includes a separation system (6). The separation system is mounted to the frame such that an operator can easily direct aggregate from the bowl (21) into the separation device (6) via chute (22). Chute (22) is directed into separation device inlet (23). The separation device (6) includes two vibrating screens configured such that processed material of a first size range exits from a first chute (7), material of a second size range discharges from a second chute (8), and material of a third size range discharges from a third chute (9). Typically, the first chute (7) discharges the largest granules, the second chute (8) discharges relatively smaller granules and the third chute (9) discharges the smallest granules. Motors (25) are typically included to vibrate the sieves/screens. It will be appreciated that more screens may be implemented to allow for separation of more aggregate size ranges. In one example, separates the processed material into above 14 mm aggregate, 6 to 13 mm aggregate and cementitious fine particles.

Figure 6:
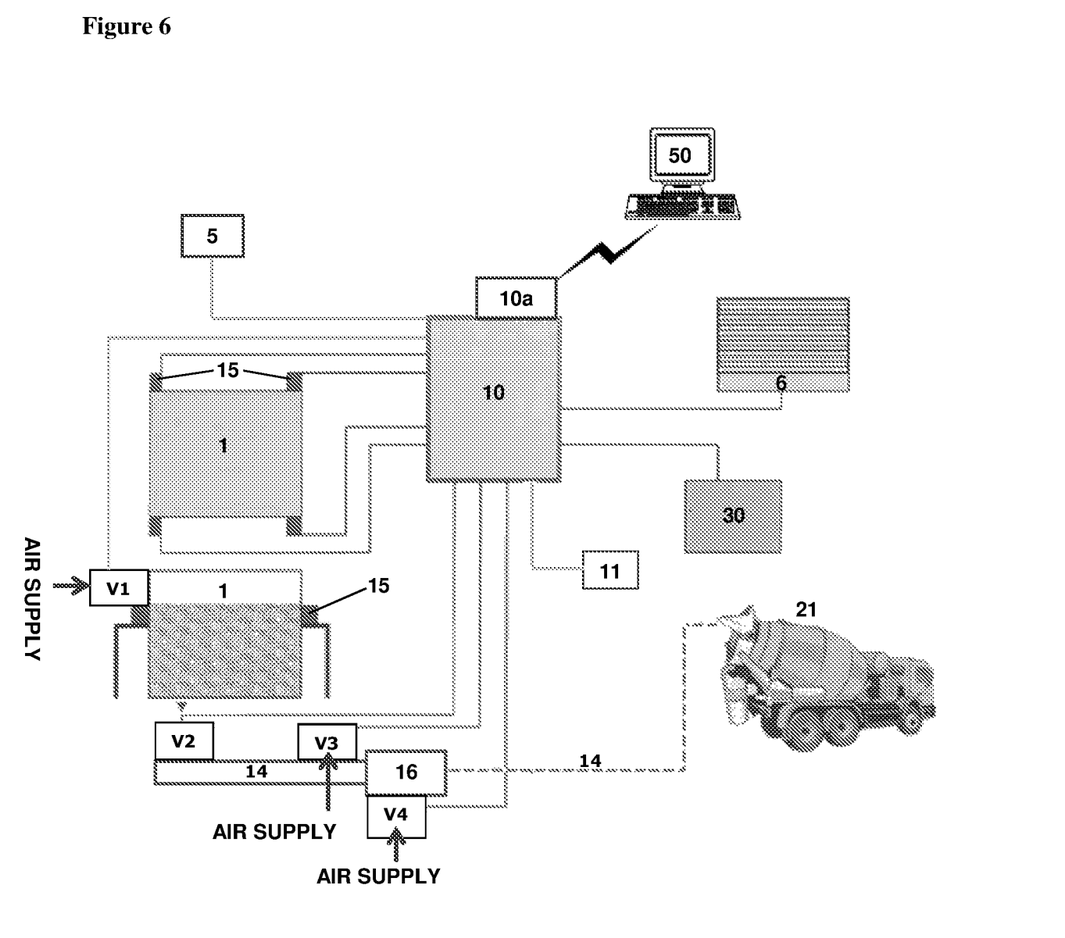
FIG. 6 is an example schematic of the connectivity of a control unit for use with the apparatus of FIG. 1.

FIG. 6 shows an example schematic of connectivity of the control unit (10). FIG. 6 shows connection of the control unit to the air compressor (5), valves of the apparatus (V1 to V4), load sensors (15), separation system (6), alarm (30) and delivery wand mount (11) etc. FIG. 8 shows example connectivity of a communication module (10a) connected to or as part of the control unit (10). As shown and as described above, information may be transmitted between the control unit (10) and a remote processing system (50) (at a head office, for example), a cloud based server (51), an operator mobile communication device (52) and/or a control system of concrete mixer truck (53). It will be appreciated that information may be transmitted between the control unit and any device that can be connected to a suitable communication network (e.g. WAN, LAN the internet etc.). It will also be appreciated that in some examples, information may be transmitted via a direct connection between the control unit communications module (10a) and a peripheral device (e.g. via Bluetooth etc.). It will also be appreciated that the communications module (10a) may be connected to peripheral devices by wired or wireless connections.

It will be also be appreciated the presently described invention is also embodied in a novel method of recycling unhardened concrete to form aggregate material that is typically facilitated by the apparatus and composition as described herein. The method including the steps of treating the unhardened concrete with a recycling composition, and mixing the treated unhardened concrete.

Figure 9:
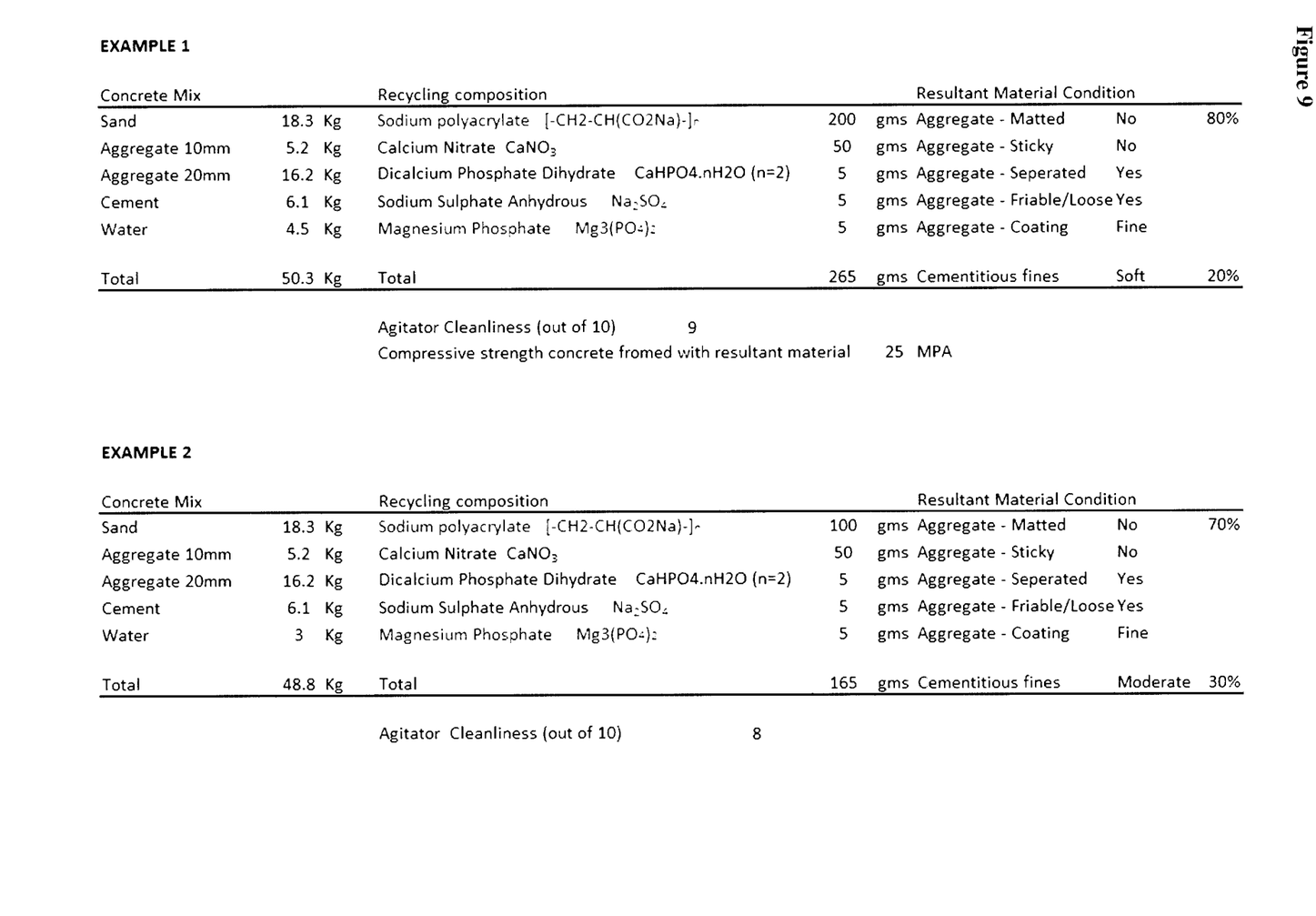
FIG. 9 shows example recycling compositions and treatment quantities.

Generally, the recycling composition takes the form of that described herein and is usually applied in an amount of 3 to 6 kg of recycling composition per tonne of unhardened concrete. Although, it will be appreciated the recycling composition and applied amount can vary depending on the quality or composition of the concrete. In some forms the composition applied includes any one or a combination of a super absorbent polymer (e.g. sodium polyacrylate), $CaNO_3$, $CaHPO_4.2H_2O$, $Na_2SO_4$, and $Mg_3(PO_4)_2$. In some forms the composition is applied such that the ratio of each the constituents to the unhardened concrete to be recycled is as follows: 0.01-0.5% (w/w) super absorbent polymer, 0.1% (w/w) $CaNO_3$, 0.01% (w/w), $CaHPO_4.2H_2O$, 0.01% (w/w) $Na_2SO_4$, 0.01% (w/w) $Mg_3(PO_4)_2$. Example recycling compositions and the application amounts thereof per mass of unhardened concrete are shown in FIG. 9.

It will be appreciated that the method may include calculation steps to calculate, for example, appropriate dispensation amounts of recycling composition and mixing times.

For example, the method may also include the step of calculating the quantity of recycling composition required for effective treatment of the unhardened concrete using information based on the quantity, quality, and/or composition of the unhardened concrete to be treated. As would be appreciated, this calculation may be facilitated by the apparatus as described herein.

The method may also include the step of calculating a mixing time required for recycling of the concrete based on the quantity, quality, and/or composition of the unhardened concrete to be treated. Again, as would be appreciated, this calculation may be facilitated by the apparatus as described herein.

In some forms, the method may further including the step of separating formed aggregated material, according to size. This step may also be facilitated by the apparatus as described herein.

Figure 10:
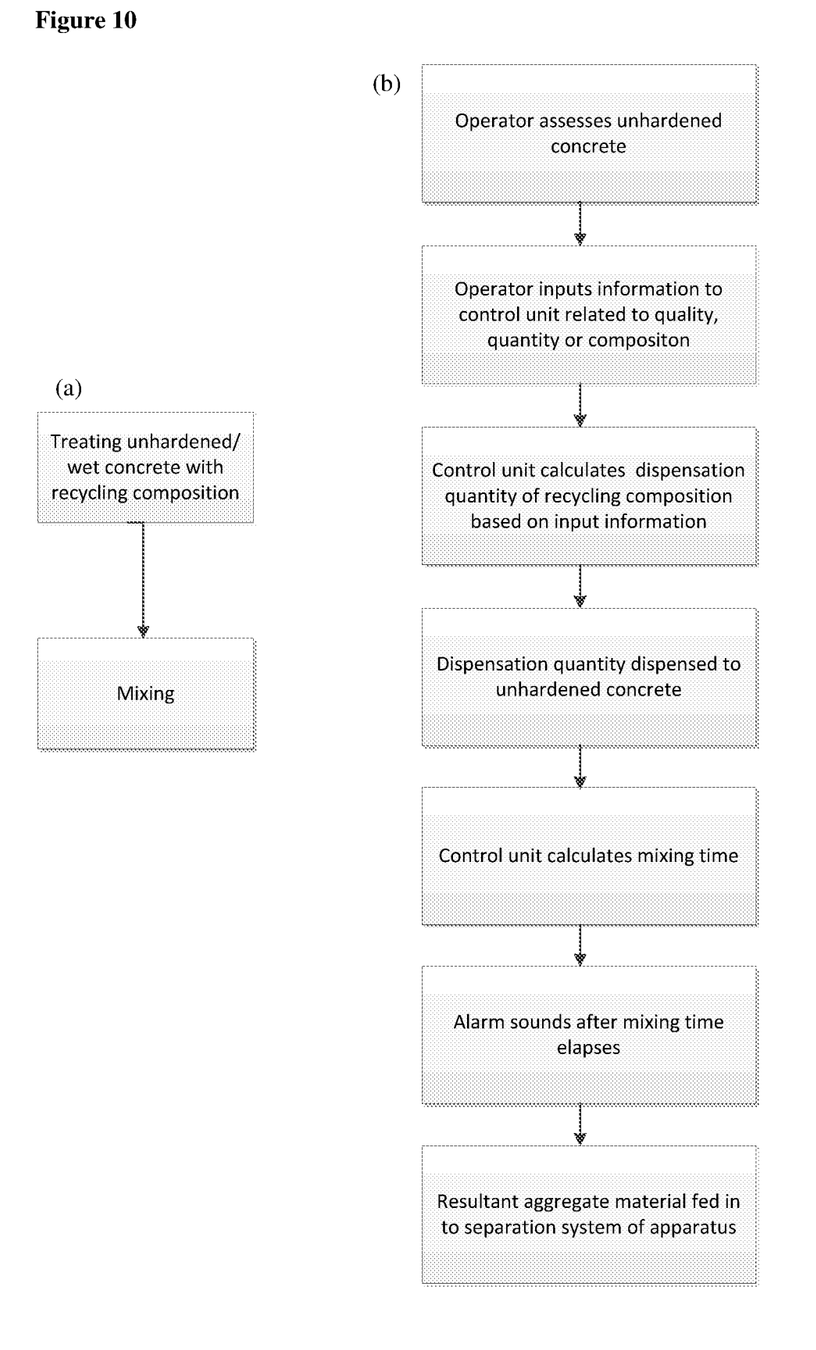
FIG. 10 shows flow charts which outline example methods step in recycling unhardened concrete to form aggregate material.

Example method steps are shown in FIG. 10. FIG. 10(a) illustrates the basic method steps of a broad form of the method. FIG. 10(b) illustrates one example of method steps when utilising the apparatus as described herein.

It will also be appreciated that in some forms, the apparatus/system may be customisable such that it may make use of existing parts. For example, various aspects, such as the control unit and ejection system may be provided with the intention of retrofitting to an existing storage tank. For example, the apparatus (100) may be provided without the storage tank, and simply fitted to an existing tank. It will be appreciated that various retrofit configurations may be possible.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

It will be appreciated that various forms of the invention may be used individually or in combination.

PARTS LIST

Storage tank—1
Storage tank internal baffle—2
Storage tank fill point—3
Storage tank outlet—4
Air supply compressor—5
Vibrating screen/sieve(s)—6
Large processed material discharge—7
Medium processed material discharge—8
Small processed material discharge—9
Control unit/PLC/switch board—10
Delivery wand mount/container—11
Delivery wand—12
Air supply hoses—13
Delivery line supply hose—14
Load sensors/cells—15
Vacuum conveyor device—16
Operator elevated platform—17
Stairs/platform access—18
Balustrade—19
Fill point access gate—20
Concrete agitator bowl—21
Agitator concrete discharge chute—22
Screen/Sieve concrete inlet—23
Retractable hose reel—24
Vibrating screen/sieve motors—25
Storage tank air supply valve—V1
Storage tank outlet valve—V2
Delivery line air supply valve (purge valve)—V3
Vacuum conveyor device air supply valve—V4

The invention claimed is:

1. An apparatus for assisting with recycling of unhardened concrete, the apparatus including:
    a storage tank for storing a recycling composition powder to be applied to the unhardened concrete, the storage tank including at least one quantity sensor for detecting a parameter related to the quantity of recycling composition powder in the storage tank;
    a control unit configured to determine a dispensation quantity based on data received related to the quantity, quality and/or composition of unhardened concrete to be recycled, and, to control release of recycling composition powder from the storage tank by comparing data received from the at least one quantity sensor with the dispensation quantity;
    a delivery line for delivering recycling composition powder released from the storage tank, the delivery line including a substantially rigid elongate delivery wand at an outlet end thereof; and
    a pneumatic ejection system configured to propel recycling composition powder released from the storage tank along the delivery line to the delivery wand.

2. The apparatus as claimed in claim 1, wherein the ejection system is controlled by the control unit.

3. The apparatus as claimed in claim 1, wherein the delivery line includes a flexible hose portion, and the delivery wand extending from the flexible hose portion.

4. The apparatus as claimed in claim 1, wherein the apparatus includes a trolley frame that permits the apparatus to be rolled along a surface.

5. The apparatus as claimed in claim 1, wherein the apparatus includes an elevated platform, the elevated platform configured to support a person at a height suitable to access an opening of an agitator bowl of a concrete mixer truck.

6. The apparatus as claimed in claim 1 further including an alarm, the alarm connected to the control unit and configured to be activated subsequent to ejection of recycling composition powder and after a calculated mixing time, the calculated mixing time being determined by the control unit based on the quantity of unhardened concrete to be recycled.

7. The apparatus as claimed in claim 6, wherein the alarm is an audible alarm.

8. The apparatus as claimed in claim 1, further including a separation system configured to receive and separate, according to size, material treated with the recycling composition powder.

9. The apparatus as claimed in claim 8, wherein the separation system includes one or more vibrating sieves.

10. The apparatus as claimed in claim 1, further including a communication module for transmitting data from the control unit to a remote processing system via a communication network.

* * * * *